(12) United States Patent
Abler et al.

(10) Patent No.: US 11,591,446 B2
(45) Date of Patent: Feb. 28, 2023

(54) POLYMER-BASED FOAM COMPOSITIONS COMPRISING INORGANIC PARTICULATE FILLERS

(71) Applicant: IMERTECH SAS, Paris (FR)

(72) Inventors: Caroline Abler, Roquettes (FR); Michael Schmidt, St. Oswald (AT); Gilles Meli, Le Fauga (FR)

(73) Assignee: IMERTECH SAS, Paris (FR)

( * ) Notice: Subject to any disclaimer, the term of this patent is extended or adjusted under 35 U.S.C. 154(b) by 0 days.

(21) Appl. No.: 15/304,793

(22) PCT Filed: Apr. 17, 2015

(86) PCT No.: PCT/EP2015/058396
§ 371 (c)(1),
(2) Date: Oct. 17, 2016

(87) PCT Pub. No.: WO2015/158897
PCT Pub. Date: Oct. 22, 2015

(65) Prior Publication Data
US 2017/0044343 A1     Feb. 16, 2017

(30) Foreign Application Priority Data
Apr. 17, 2014   (EP) ..................................... 14290112

(51) Int. Cl.
*C08J 9/00* (2006.01)
*C08J 9/12* (2006.01)
*C08K 3/22* (2006.01)
*C08K 3/34* (2006.01)

(52) U.S. Cl.
CPC ............. *C08J 9/0066* (2013.01); *C08J 9/122* (2013.01); *C08K 3/22* (2013.01); *C08K 3/34* (2013.01); *C08J 2201/03* (2013.01); *C08J 2203/06* (2013.01); *C08J 2300/21* (2013.01); *C08J 2300/26* (2013.01); *C08J 2323/06* (2013.01); *C08K 2003/2227* (2013.01)

(58) Field of Classification Search
CPC ... C08J 9/0066; C08K 3/30; C08K 2003/2227
See application file for complete search history.

(56) References Cited

U.S. PATENT DOCUMENTS

| | | | | |
|---|---|---|---|---|
| 4,243,755 A | * | 1/1981 | Marx | C08J 9/0061 521/101 |
| 5,110,834 A | | 5/1992 | Horn et al. | |
| 6,908,668 B2 | * | 6/2005 | Hanada | B32B 27/32 521/134 |
| 6,949,596 B2 | * | 9/2005 | Seidel | C08K 5/51 524/121 |
| 2002/0198272 A1 | * | 12/2002 | Hayashi | C08J 9/125 521/82 |
| 2004/0006149 A1 | * | 1/2004 | Handa | C08J 9/143 521/79 |
| 2007/0269647 A1 | | 11/2007 | Wu et al. | |
| 2009/0030095 A1 | | 1/2009 | Laverdure et al. | |
| 2011/0060085 A1 | * | 3/2011 | Gahleitner | C08F 297/08 524/423 |
| 2012/0228793 A1 | | 9/2012 | Lindenfelzer et al. | |
| 2013/0027643 A1 | * | 1/2013 | Ogasawara et al. | |

FOREIGN PATENT DOCUMENTS

| | | | |
|---|---|---|---|
| CN | 101790562 A | | 7/2010 |
| CN | 103052676 A | | 4/2013 |
| CN | 103707600 A | * | 4/2014 |
| JP | 52-4952 | | 2/1977 |
| JP | 62-95330 A | * | 5/1987 |
| JP | 7-3065 A | | 1/1995 |
| JP | 2000-281854 A | | 10/2000 |
| JP | 2001-329097 A | | 11/2001 |
| JP | 2004-323623 A | | 11/2004 |
| JP | 2008-156606 A | | 7/2008 |
| JP | 2011-25519 A | | 2/2011 |
| JP | 2013-528248 A | | 7/2013 |
| JP | 2015-521677 A | | 7/2015 |
| JP | 2016-117846 A | | 6/2016 |
| JP | 2016-130280 A | | 7/2016 |
| JP | 2016-178063 A | | 10/2016 |
| WO | WO 2014/001158 A1 | | 1/2014 |
| WO | WO 2016202359 A1 | * | 12/2016 |

OTHER PUBLICATIONS

English-language abstract and machine translation for JP 62-95330 A obtained from the European patent Office (EPO) (Year: 2018).*
"Suzorite(R) 20-S", IMERYS, p. 1 (Year: 2012).*
Phlogopite Mineral Data, Webmineral, pp. 1-6 (Year: 2018).*
English language abstract for CN-103707600-A to Aoki et al. obtained from the European Patent Office in Jul. 2020.*
Machine translation of CN-103707600-A to Aoki et al. obtained from the European Patent Office in Jul. 2020.*
Wypych, George, Handbook of Fillers, ChemTec Publishing, Fourth Edition, p. 109.*
International Search Report and Written Opinion dated Jul. 1, 2015, in International Application No. PCT/EP2015/058396 (11 pgs.).

(Continued)

*Primary Examiner* — Melissa A Rioja
(74) *Attorney, Agent, or Firm* — Finnegan, Henderson, Farabow, Garrett & Dunner, LLP

(57) ABSTRACT

There is disclosed a polymer-based foam composition comprising a polymer and up to 20 M.-% particles of one or more inorganic particulate materials, based on the total weight of the composition, wherein the one or more inorganic particulate materials comprise less than 20 wt.-% Al, calculated as $Al_2O_3$-content. According to one aspect, the one or more inorganic particulate materials comprise phyllosilicates. Also part of the present invention is the use of such polymer-based foam compositions and their method of production.

14 Claims, No Drawings

(56) References Cited

OTHER PUBLICATIONS

Search Report for Chinese Application No. 201580018947.8, dated Jul. 26, 2018.
Pi-Puig et al., "Mineralogical and Geochemical Characterization of Talc from Two Mexican Ore Deposits (Oaxaca and Puebla) and Nine Talcs Marketed in Mexico: Evaluation of Its Cosmetic Uses," Minerals, 10(5):388 (2020).

* cited by examiner

POLYMER-BASED FOAM COMPOSITIONS COMPRISING INORGANIC PARTICULATE FILLERS

CLAIM FOR PRIORITY

This application is a U.S. national phase entry under 35 U.S.C. § 371 from PCT International Application No. PCT/EP2015/058396, filed Apr. 17, 2015, which claims the benefit of priority of EP Application No. 14290112.3, filed Apr. 17, 2014, both of which are incorporated herein by reference.

FIELD OF THE INVENTION

The present invention relates to polymer-based foam compositions having improved cellular structure and using one or more inorganic particulate materials as a nucleating agent. The invention further relates to methods of providing polymer-based foam films and their use.

BACKGROUND OF THE INVENTION

Increasing oil prices have contributed to increased production costs of plastic resins and finished plastic products. Since plastic resin costs typically amount to 50 to 80% of the total cost of any given plastic product, a reduction of resin amounts in plastics while at the same time maintaining mechanical and other properties of the plastic products is of considerable economic benefit.

One of the main challenges involving polymer materials lies in the development of increasingly thinner and lighter components with improved properties for use in applications such as food packaging or the automotive industry. A possible strategy combines weight reduction by foaming of a base material with the incorporation of reinforcing and/or functional fillers acting as cell nucleants or promoters. One way to decrease the cost of materials incurred in plastics production is to develop a fine-celled or microcellular structure that maintains the overall functions and integrity of a particular product. Polymer foams are known in the art, but they have reduced stiffness and mechanical strength compared to conventional polymer.

Cell nucleating agents such as functional fillers are commonly used in polymeric foaming processes to enhance cell nucleation. With the presence of nucleating agents, heterogeneous nucleation becomes the predominant mode of cell nucleation during polymer foaming processes. Alongside improvements in stiffness and mechanical strength from nucleating agents, which are considerably reduced by the incorporation of a high gas volume fraction, their addition could result in lightweight materials with improved transport properties (thermal and/or electrical conductivities), thermal stability, flame retardancy, opacity, etc.

Blown film extrusion is a common technique to make polymer films. The process generally involves extruding a tube of molten polymer through a die and inflating the tube to several times its initial diameter to form a thin film bubble. This bubble is then collapsed and formed into a film. When blowing polymer foam films, it can be challenging to maintain a good cell structure because there is a tendency to distort the foam cells during the blowing process.

Accordingly, a technique for producing a polymeric foam film and other polymer-based foam compositions having a quality cell structure would be desirable.

SUMMARY OF THE INVENTION

The present invention is defined in the appended claims.

In one aspect, the present invention relates to a polymer-based foam composition comprising a polymer and up to 20 wt.-% particles of one or more inorganic particulate materials, based on the total weight of the composition. According to this aspect, the one or more inorganic particulate materials comprise 50 wt.-% or less Al, calculated as $Al_2O_3$-content, such as for example less than 50 wt.-% Al, or less than 40 wt.-% Al, or less than 30 wt.-% Al, or less than 20 wt.-% Al, or less than 18 wt.-% Al, or less than 15 wt.-% Al, or less than 12 wt.-% Al, or less than 10 wt.-% Al, or less than 5 wt.-% Al, or less than 4 wt.-% Al, or less than 3 wt.-% Al, or less than 2 wt.-% Al, or less than 1 wt.-% Al, or less than 0.5 wt.-% Al. In certain embodiments, the inorganic particulate material comprises greater than 0 wt.-% Al. In certain embodiments, the inorganic particulate material comprises one or more phyllosilicates. In particular embodiments, the one or more phyllosilicates comprise talc. In one embodiment, the one or more phyllosilicates consists of talc. For example, the one or more phyllosilicates consists of pure talc.

In one aspect, the present invention relates to a polymer-based foam composition comprising a polymer and up to 20 wt.-% particles of one or more phyllosilicates, based on the total weight of the composition. According to this aspect, the one or more phyllosilicates comprise aluminium.

According to one aspect of the invention, the polymer-based foam composition may comprise a polymer-based foam film having a thickness ranging from 1 to 850 µm, such as for example ranging from 10 to 300 µm.

According to one aspect of the invention, the one or more phyllosilicates of the polymer-based foam composition further comprise one or more of talc, chlorite, kaolin, mica and/or pyrophyllite.

According to one aspect of the invention, the one or more inorganic particulate materials of the polymer-based foam composition comprise aluminium in an amount ranging from greater than 0 to 50 wt.-%, such as for example ranging from 0.5 wt.-% to 20 wt.-%, such as for example ranging from 1 wt.-% to not including 20 wt.-%, such as for example ranging from 5 wt.-% to 10 wt.-%, all values calculated as $Al_2O_3$-content.

According to one aspect of the invention, in the polymer-based foam composition the polymer is a thermoplastic, a thermoplastic elastomer, or a rubber. For example, the thermoplastic may be a polyolefin, such as for example polyethylene or polypropylene.

According to one aspect of the invention, the polymer may be the major component of the polymer-based foam composition.

According to one embodiment of the invention, any talc comprised in the polymer-based foam composition may have a surface BET area of 1 to 200 $m^2 \cdot g^{-1}$, such as for example of 2 to 100 $m^2 \cdot g^{-1}$.

According to one embodiment of the present invention, the polymer-based foam composition may have an average cell size of $\varphi$=600 µm or less in either the vertical direction ($\varphi_{VD}$), or the width direction ($\varphi_{WD}$) or both.

According to one embodiment of the present invention, the polymer-based foam composition may have a ratio $\varphi_{VD}/\varphi_{WD}$ of the average cell size in a vertical direction $\varphi_{VD}$ to the average cell size in a width direction $\varphi_{WD}$ of 1 or more.

According to one embodiment of the present invention, the polymer-based foam composition may contain $N_f$=10,000 or more cells per $cm^3$.

According to further embodiments of the present invention, the polymer-based foam composition may be produced by an extrusion process, or by a blown film process.

Also part of the present invention is the use of a polymer-based foam composition of the invention in the production of packagings, food packaging products, plastic parts for automotive vehicles, thermal and/or noise insulation foams, pipes, consumer goods and appliances.

Also part of the present invention is a method of formation of the polymer-based foam composition of the invention. The method comprises the steps of providing a polymer composition, providing inorganic particulate materials comprising 50 wt.-% or less Al, calculated as $Al_2O_3$-content, such as for example less than 50 wt.-% Al, or less than 40 wt.-% Al, or less than 30 wt.-% Al, or less than 20 wt.-% Al, or less than 18 wt.-% Al, or less than 15 wt.-% Al, or less than 12 wt.-% Al, or less than 10 wt.-% Al, or less than 5 wt.-% Al, or less than 4 wt.-% Al, or less than 3 wt.-% Al, or less than 2 wt.-% Al, or less than 1 wt.-% Al, or less than 0.5 wt.-% Al, introducing the particles into the polymer composition in a blown film process, and foaming the polymer composition using a gas such as $CO_2$, nitrogen or a noble gas.

DETAILED DESCRIPTION OF THE INVENTION

The present invention according to the appended claims provides for polymer-based foam compositions, such as polymer-based foam films, having decreased material density and/or decreased film thickness while maintaining the overall mechanical properties of the compositions.

In certain embodiments, the present invention provides an effective nucleating effect in extrusion-blown foamed films, allowing decreased material density without impacting the overall mechanical properties as compared to unfoamed film performances. For instance, the density of the polymer-based foam film may be reduced by an amount ranging from 10 to 20 %.

Achieving an improved foam quality by using more efficient mineral nucleators may also allow reduction of mineral content while maintaining the same foam structure and quality as compared to less suitable minerals at higher addition rate. Using less mineral in the polymer-based foam composition would be beneficial for maintaining certain mechanical film properties such as puncture test performance which usually suffers from adding high quantities of minerals. Thus, according to certain embodiments, the polymer-based foam compositions of the present invention may have an improved first puncture test performance as compared to a second puncture test performance for the polymer-based foam compositions being devoid of the inorganic particulate materials as described herein. Puncture tests as understood herein are typically carried out according to standard ASTM D5748.

Without wishing to be bound by a particular theory, it is believed that the chemical composition of certain inorganic particulate materials such as phyllosilicates or combinations thereof, particularly phyllosilicates comprising a certain amount of aluminium, provides an enhanced cell nucleation effect as compared to other inorganic particulate materials such as phyllosilicates or combinations thereof at the same fineness and concentration in polymer-based foam compositions. Phyllosilicates including aluminium are more polar than aluminium-free phyllosilicates such as talc, and they are believed to have less affinity with low polarity materials like polyethylene. This lower affinity between the mineral and the material may result in a de-wetting effect between the mineral particles and the polymer that would be favorable for the nucleation of cells in a foamed composition. As a result, the degassing pressure evolution of the dissolved physical blowing agent versus time is believed to be such that higher foam cell densities result.

In addition, reduction of polymer stiffness and mechanical strength caused by the incorporation of a high gas volume fraction is at least partially compensated by the incorporation of phyllosilicate particles, acting both as a nucleating agent and as a reinforcing filler.

Inorganic Particulate Materials

The inorganic particulate materials may, for example, be talc, an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, mica, perlite, diatomaceous earth, magnesium hydroxide, bentonite, wollastonite, or aluminium trihydrate, or combinations thereof.

Phyllosilicate Particles

According to certain embodiments of the present invention, the inorganic particulate materials are one or more phyllosilicates and suited for use as nucleants and/or fillers in the production of polymer foams, provided the one or more phyllosilicates comprise no more than 50 wt.-% aluminium, such as for example less than 20 wt.-% aluminium, calculated as $Al_2O_3$-content. As used herein, the indication that one or more phyllosilicates comprise aluminium is to be understood such that aluminium atoms are present in the one or more phyllosilicates, including the situation where there is aluminium present in some but not all of the one or more phyllosilicates. Aluminium may be present within the crystal structure of the one or more phyllosilicates.

The one or more phyllosilicates used in certain embodiments of the present invention may additionally be selected from kaolin, talc, chlorite, pyrophyllite, and mica. Chemically pure talc may not contain any aluminium atoms in its crystal structure, therefore the use of pure talc alone does not necessarily fall within the scope of the present invention in certain embodiments. For example, according to some aspects of the present invention, the one or more phyllosilicates may consist of talc and kaolin only, or the one or more phyllosilicates may consist of talc and chlorite only, or the one or more phyllosilicates may consist of talc, chlorite and mica only, or the one or more phyllosilicates may consist of a mixture of talc and one or more of kaolin, chlorite, pyrophyliite, and/or mica. Any other combinations of one or more phyllosilicates form part of the present invention, provided that the mixture of one or more phyllosilicates comprises aluminium, or provided that the mixture of one or more phyllosilicates comprises talc, as the case may be.

In one embodiment, a single particulate phyllosilicate is used in order to produce a ground material. For example, the particulate phyllosilicate mineral may be mica or the single particulate phyllosilicate mineral may be chlorite. In one embodiment, a combination of two or more phyllosilicates may be used, for example a combination of mica and talc may be used. For example, a mixture of two or more particulate phyllosilicate minerals may be ground together (i.e., co-ground). For example, mica and talc may be co-ground to obtain a phyllosilicate mixture for use in the compositions disclosed herein. In certain embodiments, the ground materials may be acid washed or further beneficiated according to any known beneficiation process.

Hereinafter, certain embodiments of the present invention may tend to be discussed in terms of phyllosilicates or talc.

However, the invention should not be construed as being limited to such embodiments. It should be understood that alternative embodiments may include other inorganic particulate materials substituting for phyllosilicates or talc in such embodiments.

Talc may be suitable for use in certain embodiments of the present invention. The talc may comprise, include, consist essentially of, or consist of natural talc particulate or synthetic talc particulate or a mixture of natural talc particulate and synthetic talc particulate.

As used herein, the term "natural talc" means talc derived from a natural resource, i.e., natural talc deposits. Natural talc may be the hydrous magnesium silicate of formula $Si_4Mg_3O_{10}(OH)_2$, which is arranged as a stack of laminae, and may be associated with other minerals, for example, dolomite. Natural talc occurs as rock mainly composed of talc crystals.

As used herein, the term "synthetic talc" means talc that has been synthesized using a man-made synthetic process.

The talc used in the present invention may be a macrocrystalline talc or microcrystalline talc. In certain embodiments of the present invention, the one or more phyllosilicates may be a mineral mixture which contains talc. For instance, the one or more phyllosilicates may comprise a majority of a phyllosilicate comprising aluminium and a minority of talc.

In certain embodiments, clay may be used as a part of the one more phyllosilicates, in a processed or unprocessed form, such as for example a kaolin clay. The kaolin clay may be a processed material derived from a natural source, namely raw natural kaolin clay mineral. The processed kaolin clay may typically contain at least about 50% by weight kaolinite.

The kaolin clay may be prepared from the raw natural kaolin clay mineral by one or more other processes which are well known to those skilled in the art, for example by known refining or beneficiation steps. For example, the clay mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step. The clay mineral may be treated to remove impurities, e. g. by flocculation, flotation, or magnetic separation techniques well known in the art. Alternatively the clay mineral may be untreated in the form of a solid or as an aqueous suspension.

The process for preparing the particulate kaolin clay used in the present invention may also include one or more comminution steps, e.g., grinding or milling. Light comminution of a coarse kaolin may be used to give suitable delamination thereof. The comminution may use beads or granules of a plastic (e. g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired particle size distribution.

In certain embodiments, the one or more phyllosilicates may comprise aluminium in an amount equal to or greater than 0.1 wt.-%, calculated as $Al_2O_3$-content. For instance, the one or more phyllosilicates may comprise aluminium in an amount equal to or greater than 1 wt.-%, or equal to or greater than 5 wt.-%, or equal to or greater than 10 wt.-%, or equal to or greater than 20 wt.-%, or equal to or greater than 30 wt.-%, or equal to or greater than 40 wt.-%, or equal to or greater than 50 wt.-%, calculated as $Al_2O_3$-content.

In one embodiment, the one or more phyllosilicates particles may comprise talc particles, including aluminium in an amount ranging from greater than 0 to 43.4 wt.-%, such as for example up to but not including 20 wt.-%, calculated as $Al_2O_3$-content.

In certain embodiments, the one or more phyllosilicates may comprise silicon in an amount ranging from up to 87 wt.-%, such as for example from 34 to 62 wt.-%, calculated as $SiO_2$-content, magnesium in an amount of 22 wt.-% or more, such as for example ranging from 31 to 33 wt.-%, calculated as MgO-content, potassium in an amount ranging from 0 to 12 wt.-%, calculated as $K_2O$-content, and aluminium in an amount ranging from greater than 0 to 43.4 wt.-%, such as for example up to 20 wt.-%, calculated as $Al_2O_3$-content.

In some embodiments, the one or more phyllosilicates have a loss on ignition value at 1050° C. ranging from 5 to 13 wt.-%.

In another embodiment, the one or more phyllosilicates may comprise a surface-treated pure, talc with a bi-functional chemical additive to make the talc surface less compatible to the resin matrix. For example, the surface may be treated with stearic acid or metal salts of stearic acid, such as for example calcium stearate, magnesium stearate or zinc stearate, or any other suitable metal stearate. In other embodiments, the one or more phyllosilicates may be surface-treated with polyethylene glycol, a silane, and/or a siloxane. In some embodiments, the surface-treatment (e.g, stearic acid, polyethylene glycol, a silane or a siloxane) may be present in the polymer composition up to 0.11 wt. % based on the weight of the polymer composition. In certain embodiments the one or more phyllosilicates including aluminium, such a surface treatment may be avoided as aluminium oxide is more polar and thus less compatible to unpolar resins like polyolefins (e.g., polypropylene, polyethylenes such as linear low density polyethylene or linear low density polypropylene).

The particles of the one or more phyllosilicates comprised in the polymer foams according to certain embodiments of the present invention may have a $d_{50}$ by Sedigraph ranging from 0.5 to 10 µm. For example, the $d_{50}$ of the phyllosilicate may be ranging from 1.0 to 7.5 µm, such as 1.0 to 5 µm, or 3.0 to 4.5 µm. Unless otherwise mentioned, the properties were measured by sedimentation of the particulate material according to ISO 13317-3 in a fully dispersed condition in an aqueous medium using a "Sedigraph 5100" machine as supplied by Micrometrics Instruments Corporation, Norcross, Ga., USA, referred to herein as a "Micrometrics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ given herein is the value determined in this way of the particle e.s.d at which there are 50% by weight of the particles which have an equivalent spherical diameter less than that $d_{50}$ value.

Furthermore, the one or more phyllosilicates comprised in the polymer foams according to certain embodiments of the present invention may have a surface BET area in the range of 1 to 200 $m^2 \cdot g^{-1}$, such as for example from 2 to 100 $m^2 \cdot g^{-1}$, or up to 50 $m^2 \cdot g^{-1}$, or up to 25 $m^2 \cdot g^{-1}$, such as for example about 5 $m^2 \cdot g^{-1}$, or about 10 $m^2 \cdot g^{-1}$, or about 20 $m^2 \cdot g^{-1}$, or about 21 $m^2 \cdot g^{-1}$. As used herein, the surface BET area is the specific surface area measured according to DIN ISO 9277.

Moreover, the one or more phyllosilicates comprised in the polymer foams according to certain embodiments of the present invention may have an aspect ratio according to Jennings theory in the range of from 3 to 25, from 5 to 20, from 9 to 15, or from 10 to 15. The Jennings theory (or Jennings approximation) of aspect ratio is based on research performed by W. Pabst, E. Gregorova, and C. Berthold, Department of Glass and Ceramics, Institute of Chemical Technology, Prague, and Institut für Geowissenschaften, Universität Tübingen, Germany, as described e. g. in Pabst W., Berthold C,: Part. Part. Syst. Charact. 24 (2007), 458.

Polymeric Materials

In general, the polymer foam compositions, such as the polymer-based blown films, may be formed of any suitable polymeric material. Suitable polymeric materials include thermoplastics, thermoplastic elastomers, polyolefins, and polystyrene. Blends of more than one polymeric material, such as blends of polypropylenes, polyethylenes, or both, may be suitable. The polymer foams may be foamed with physical blowing agents. In certain embodiments, the polymer foams may be devoid of chemical blowing agents. Polypropylene foam films are suited for use in the food packaging and the automotive industries. Polystyrene foam films are suitable for use e.g. as packaging products or as insulating materials.

According to one embodiment of the present invention, the polymer may be the major component of the polymer-based foam composition, i.e. present in an amount greater than 50% by weight of the composition. In some embodiments, the polymer may be present in an amount (by weight of the composition) of 55% or more, 80% or more, 70% or more, 80% or more, 90% or more, 95%, or 99% or more.

The polymer based foam compositions according to certain embodiments of the present invention may be polypropylene foams, such as polypropylene homopolymer foams, loaded with varying concentrations of phyllosilicate. The polymer based foam compositions according to certain embodiments of the present invention may also be polyethylene foams, produced from polyethylene resins such as low density polyethylene, or linear low density polyethylene.

Polymer-Based Foam Compositions

In certain embodiments, the polymer-based foam compositions comprise a polymer-based foam film. For instance, the polymer-based foam film has a thickness ranging from 1 to 1000 µm, such as for example from 10 to 300 µm, such as about 50µor about 100 µm or about 150 µm or about 200 µm.

In particular embodiments, the one or more phyllosilicates may be present in an amount of up to 20 wt. %, or of up to 10 wt. %, based on the total weight of the composite (unfoamed) material, or in an amount of up to 5 wt.-%, or in an amount ranging from 0.1 wt.-% to 5 wt.-%, or from 0.1 wt.-% to 20 wt.-%, or from 1 wt.-% to 10 wt.-%.

The polymer-based foam compositions according to certain embodiments of the present invention may have average cell sizes of 150 µm or less, or 100 µm or less, or 80 µm or less, or even 40 µm or less, in either the vertical direction ($\varphi_{VD}$), or the width direction ($\varphi_{WD}$) or both. The ratio $\varphi_{WD}/\varphi_{VD}$ of the average cell size in a width direction $\varphi_{WD}$ to the average cell size in a vertical direction $\varphi_{VD}$ may be 0.7 or more, such as for example 0.8 or more, or even 0.9 or more.

The polymer-based foam compositions according to certain embodiments of the present invention may have cell concentrations ($N_f$) in the foam of $1\times10^4$ cells·cm$^{-3}$ or more, such as for example $5\times10^4$ cells·cm$^{-3}$ or more, such as for example $1\times10^5$ cells·cm$^{-3}$ or more, such as for example $4\times10^5$ cells·cm$^{-3}$ or more, such as for example $1\times10^6$ cells·cm$^{-3}$ or more, or even $5\times10^6$ cells·cm$^{-3}$ or more, or in some cases even $1\times10^7$ cells·cm$^{-3}$ or more. The polymer-based foam composition according to certain embodiments of the present invention may contain $10^6$ or more cells per cm$^3$ ($N_f$).

The polymer-based foam compositions according to certain embodiments of the present invention may have relative densities, when compared to the respective unfoamed base materials, ranging from 0.40 to 0.95, such as ranging from 0.55 to 0.90.

In the polymer-based foam compositions according to certain embodiments of the present invention the elastic storage modulus may be influenced by the foaming, when compared to the elastic storage modulus of the unfoamed product.

In certain embodiments, foaming may be performed by $CO_2$-dissolution, with $CO_2$ as the physical blowing agent and a $CO_2$saturated polymer-based composition being foamed in one-step by applying a pressure drop. In certain embodiments, foaming may be performed with $N_2$, noble gases or any other gas which may be injected into a polymer melt in supercritical state.

The cellular structure of the various foams described above may be studied using a "JEOL JSM-5610" scanning electron microscope (SEM) from samples cryogenically fractured using liquid nitrogen and made conductive by sputter deposition of a thin layer of gold. The average cell size ($\varphi$) and cell density ($N_f$) may be directly obtained from low-magnification micrographs using the intercept counting method [G. L. A. Sims and C. Khunniteekool, Cell size measurement of polymeric foams, *Cellular Polymers*, 13, 137 (1994)]. In particular, $N_f$ may be determined according to the following equation:

$$N_f = \left(\frac{n}{A}\right)^{\frac{3}{2}} \cdot \left(\frac{\rho_s}{\rho_f}\right),$$

wherein n is the number of cells per area A (in cm$^2$), and $\rho_s$ and $\rho_f$ are respectively the solid and foam densities.

Two different cell sizes may be determined, $\varphi_{VD}$, with VD representing the vertical direction, in this case being the cell size in the direction of pressure release, and $\varphi_{WD}$ with WD representing the width direction.

In certain embodiments, the incorporation of talc may result in polymer-based foam films with lower average cell sizes and higher cell densities, from the heterogeneous cell nucleation effect promoted by the talc particles. Also, polypropylene-talc foams may display a more isotropic-like cellular structure (aspect ratios closer to 1) when compared to the unfilled polypropylene foams.

In particular embodiments, nucleants may provide a combination of smaller, more uniform cell size/shape and smooth film surface properties.

The polymer-based foam compositions may be made by any method known in the art. In certain embodiments, the polymer foam films may be made by the methods described in U.S. Patent Application Publication No. US 2012/0228793.

EXAMPLES

Tests and analytical results of filled polyethylene foams and films according to the present invention are described herein. 100 µm films were obtained through blown film extrusion of a low-density polyethylene (LDPE) formulation containing 5 wt.-% phyllosilicates, as described herein-above. The process was carried out with a throughput of about 8 kg/h and an N2-pressure of about 90 bar.

In order to test the performance of various phyllosilicate compositions of varying Al-content, the following tests were performed. The compositions used as nucleating agents are listed in Table I.

TABLE I

List of phyllosilicates used in the Examples

| Number | Phyllosilicate |
|---|---|
| Inventive Example 1 | phyllosilicate having 1 wt.-% Al |
| Inventive Example 2 | Talc having less than 0.5 wt.-% Al |
| Comp. Ex. | phyllosilicate having 20 wt.-% Al |

The phyllosilicate according to Inventive Example 2 has a BET surface area of 6.5 m$^2$×g$^{-1}$ and a d$_{50}$-median diameter of 3.7 μm. The Al-containing phyllosilicate according to the Comparative Example has a d$_{50}$-median diameter of 5.8 μm.

The phyllosilicate of Inventive Example 1 was phyllosilicate comprising about 1 wt.-% aluminium, calculated as Al$_2$O$_3$-content.

The properties of the polyethylene films obtained under the same conditions, and using the different phyllosilicates as listed above are shown in Table II.

TABLE II

Properties of films obtained

| Number | foam cell density (cells × cm$^{-3}$) | Density (g × cm$^{-3}$) | average foam cell diameter (μm) |
|---|---|---|---|
| Inventive Example 1 | 4.44 × 10$^5$ | 0.45 | 130.3 |
| Inventive Example 2 | 4.34 × 10$^5$ | 0.51 | 125.3 |
| Comparative Example | 7.98 × 10$^4$ | 0.51 | 221.2 |

It can be seen from the Inventive Examples 1 and 2, when compared to the Comparative Example, that the properties obtained according to the present invention are improved, compared to when 20 wt.-% Al-containing phyllosilicate is employed.

The invention claimed is:

1. A polymer-based foam composition comprising a polymer; and
   from 1 to 20 wt.-% inorganic particulate materials, based on the total weight of the polymer-based foam composition;
   wherein the inorganic particulate materials comprise chlorite and at least one phyllosilicate selected from mica, talc, kaolin, and combinations thereof;
   wherein the inorganic particulate materials comprise from 1 wt.-% Al to 10 wt.-% Al; and
   wherein the inorganic particulate materials have a d$_{50}$ from 3 to 4.5 microns.

2. A polymer-based foam composition comprising inorganic particulate materials that comprise chlorite and at least one phyllosilicate selected from mica, talc, kaolin and combinations thereof;
   wherein the inorganic particulate materials comprise from 1 wt.-% Al to 10 wt.-% Al; the polymer-based foam composition contains N$_f$=100,000 or more cells per cm$^3$; and
   the inorganic particulate materials have a d$_{50}$ from 3 to 4.5 microns.

3. The polymer-based foam composition according to claim 1, wherein the polymer-based foam composition comprises a polymer-based foam film having a thickness ranging from 1 to 850 μm.

4. The polymer-based foam composition according to claim 1, wherein the polymer is a thermoplastic polymer or a rubber.

5. The polymer-based foam composition according to claim 4, wherein the thermoplastic polymer is a polyolefin.

6. The polymer-based foam composition according to claim 1, wherein the polymer is present in a greater weight amount than any other component of the polymer-based foam composition.

7. The polymer-based foam composition according to claim 1 having an average cell size of φ=600 μm or less in either the vertical direction (φ$_{VD}$), or the width direction (φ$_{WD}$) or both.

8. The polymer-based foam composition according to claim 1 having a ratio φ$_{VD}$/φ$_{WD}$ of the average cell size in a vertical direction φ$_{VD}$ to the average cell size in a width direction φ$_{WD}$ of 1 or more.

9. The polymer-based foam composition according to claim 1 containing N$_f$=100,000 or more cells per cm$^3$.

10. The polymer-based foam composition according to claim 1 produced by an extrusion process.

11. The polymer-based foam composition according to claim 1 produced by a blown film process.

12. A method of manufacturing a good, the method comprising incorporating the polymer-based foam composition of claim 1 in the good, wherein the good comprises packaging, a food packaging product, a plastic part for automotive vehicles, or a thermal and/or noise insulation foam, pipe, consumer good or appliance.

13. A method of formation of the polymer-based foam composition as defined in claim 1, comprising:
   a) providing a polymer composition;
   b) providing the inorganic particulate materials;
   c) introducing the inorganic particulate materials into the polymer composition in a blown film process; and
   d) foaming the polymer composition using a gas.

14. The method of claim 13, wherein the gas is CO$_2$, nitrogen, or a noble gas.

* * * * *